3,253,033
METHYLENEDIPHOSPHINE PRODUCTS AND
PROCESS FOR THE PREPARATION THEREOF
Ludwig Maier, Zurich, Switzerland, assignor to Monsanto Company, a corporation of Delaware
No Drawing. Filed Aug. 16, 1962, Ser. No. 217,292
Claims priority, application Switzerland, Aug. 25, 1961, 9,913/61
15 Claims. (Cl. 260—570.5)

It has been found that by reacting substituted or unsubstituted aminomethylphosphines with hydrogen phosphide, mono- or diorganophosphines, there are formed methylenediphosphines which contain at least once the grouping P—CH₂—P. The expression "unsubstituted or substituted aminomethylphosphines" signifies that on the phosphorus atom may be only aminomethyl radicals or in addition to 1 or 2 aminomethyl radicals, 2 or 1 hydrocarbon radicals.

The preparation of the aminomethylphosphines serving as starting materials is well known. They can be obtained for example from substituted or unsubstituted hydroxymethylphosphonium salts and primary or secondary amines (Brit. P. 842,593 Albright and Wilson Mfg. Ltd., Oldburry), or, hydrogen phosphide, primary or secondary phosphines and either formaldehyde and primary or secondary amines, or methylolamines, or primary or secondary methylenediamines (German patent application 1,096,905, Albright and Wilson Mfg. Ltd., Oldburry). These reactions are represented by equation as follows:

(1) Hydroxymethylphosphonium salts + primary or secondary amines, or
(2) $PH_3$ or $PH_2R$ or $PHR_2$+primary or secondary amines+formaldehyde, or
(3) $PH_3$ or $PH_2R$ or $PHR_2$+methylolamines.

In all of the above reactions primary or secondary diamines can be used instead of monoamines. The oxygen or sulfur analogs reactants are prepared by oxidation or sulfurization techniques discussed hereinbelow.

One reactant for carrying out the instant invention, corresponds to the general formula $$R_aP(CH_2NR'R'')_{3-a}$$

R is an alkyl, aralkyl, cycloalkyl, aryl or heterocyclic radical which can have as a substituent another phosphino group. When two R's are present, they can form together with the phosphorus atom a heterocyclic ring. One R can also be a similar phosphino group resulting in a diphospine. R' and R" are alkyl, aralkyl, cycloalkyl, aryl or heterocyclic radicals which can be unsaturated and/or substituted, or R" can also be a hydrogen atom, or R' and R" can form together with nitrogen a heterocyclic ring like pyrrole, piperidine, morpholine; $a$ is 0, 1 or 2. The NR'R" part of at least one aminomethyl substituent is derived from a primary or secondary amine easily volatile. Bearing in mind limitations set forth in the previous sentence and elsewhere herein, R, R' and R" will each normally contain not more than 18 carbon atoms and usually not more than 8 carbon atoms.

R, R' and R" may be identical or different and also be unsaturated and/or substituted, to the extent that substituents present do not disturb the reaction.

For the present process aminomethylphosphines are also suitable which correspond to, for example, one of the following formulae:

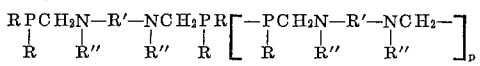

or the oxygen or sulfur analogs can be used. It is assumed that the molecule part R"N—R'—NR" is a radical of a volatile diamine such as diaminoethane, di(methylamino)ethane. When in the above formulae R is replaced by a group R"R'NCH₂ being capable of undergoing the reaction, the molecule part R"N—R'—NR" may be, of course, also derived from a difficulty or non-volatile diamine, such as piperazine, phenylenediamine and melamine.

The simplest aminophosphorus derivatives suitable to put into practice the process are, e.g., $P(CH_2NHCH_3)_3$, $P[CH_2N(CH_3)_2]_3$, $CH_3P(CH_2NHCH_3)_2$ $CH_3P[CH_2N(CH_3)_2]_2$, $(CH_3)_2PCH_2NHCH_3$ $(CH_3)_2PCH_2N(CH_3)_2$.

The second reactant is of the general formula $$R_aPH_{3-a}$$

wherein R and $a$ again possess the significance mentioned above are used as a second reactant in the process of invention. The simplest representatives are, e.g., $PH_3$, $CH_3PH_2(CH_3)_2PH$. However, also included are compounds, such as $H_2P$—$PH_2$, $RHP$—$PHR$
$H_2P$—$R'''$—$PH_2$
$RHP$—$R'''$—$PHR(R'''$=hydrocarbon radical) since these can be reacted in a similar way.

According to the reactants and to their stoichiometric ratio, there can be formed methylenediphosphines which show one, two, three or more successive P—CH₂—P bonds, or the oxygen or sulfur analogs thereof. Consequently such compounds are methylenediphosphines, dimethylenetriphosphines, branched trimethylenetetraphosphines, cyclic methylenediphosphines (4- and 8-membered rings) or polymeric methylenediphosphines, or oxygen or sulfur analogs, all of which are based on one of the following illustrated backbone:

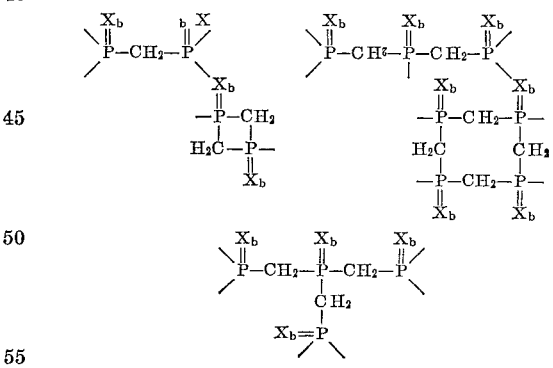

wherein X is an oxygen or sulfur atom and $b$ is 0 or 1. A methylenediphosphine is obtained by reacting a mono-(aminomethyl)phosphine with a secondary phosphine according to the equation:

(I) $R_2PCH_2NR'R''+R_2PH \rightarrow R_2PCH_2PR_2+R'R''NH$

It is obvious to one skilled in the art that the organic radicals R in the amino ethylphosphine derivative and in the phosphine may be like or unlike, and as a result there are formed symmetric or unsymmetric methylenediphosphines. It is also clear that, if two radicals are attached to the one phosphorus atom, these may be different from one another.

A dimethylenetriphosphine is obtained by reacting either a bis(aminomethyl)phosphine derivative with twice an equimolar amount of a secondary phosphine, or, a primary phosphine with twice an equimolar amount of a mono(aminomethyl)phosphine derivative. This reaction occurs according to one of the following equations:

(II)
$$RP(CH_2NR'R'')_2 + 2R_2PH \longrightarrow$$
$$R_2P-CH_2-P-CH_2-PR_2 + 2R'R''NH$$
$$\overset{|}{R}$$
$$2R_2PCH_2NR'R'' + RPH_2 \longrightarrow$$

(III)

Branched trimethylenetetraphosphines are obtained by reaction of either a tris(aminomethyl)phosphine with three times the equimolar quantity of a secondary phosphine, or, hydrogen phosphide with three times the equimolar quantity of a mono(aminomethyl)phosphine derivative:

(IV)
$$P(CH_2NR'R'')_3 + 3R_2PH \longrightarrow$$
$$\begin{array}{c} R_2P-CH_2-P-CH_2-PR_2 \\ | \\ CH_2 \\ | \\ P-R_2 \end{array} + 3R'R''NH$$
$$3R_2PCH_2NR'R'' + PH_3 \longrightarrow$$

(V)

Cyclic or polymeric methylenediphosphines are formed by reaction of equimolar quantities of a bis(aminomethyl)phosphine derivative and of a primary phosphine:

(VI)
$$n\ RP(CH_2NR'R'')_2 + n\ RPH_2 \longrightarrow$$
$$\left[\begin{array}{c} -P-CH_2-P-CH_2- \\ | \quad\quad\quad | \\ R \quad\quad\quad R \end{array}\right]_p + 2n\ R'R''NH$$

When cyclic products are made, $p$ is chiefly 2 or 4. At the ends of the chains of linear polymers containing a large number of P—CH$_2$—P bonds connected straightly in series, are found, of course, a hydrogen atom, or CH$_2$NR'R'' group respectively.

It is clear that the molecular weight of the resulting polymeric methylenediphosphines can be altered by varying the molar proportions of the reaction partners, or by adding a definite amount of a monofunctional reactant which will interrupt the chain.

Cross-linked polymers are obtained by reacting a bis(aminomethyl)phosphine derivative and hydrogen phosphide, or, a tris(aminomethyl)phosphine and a secondary phosphine in suitable proportions:

(VII)
$$3n\ RP(CH_2NR'R'')_2 + 2n\ PH_3$$
$$2n\ P(CH_2NR'R'')_3 + 3n\ RPH_2$$
$$\left[\begin{array}{c} R \quad\quad\quad\quad R \\ | \quad\quad\quad\quad | \\ -P-CH_2-P-CH_2-P-CH_2-P-CH_2- \\ | \quad\quad\quad\quad | \\ CH_2 \quad\quad\quad CH_2 \\ | \\ R-P- \end{array}\right]_n + 6n\ R'R''NH$$

(VIII)

According to the stereochemical facts which are present, a bicyclic tetramethylenetetraphosphine can be formed. In this case $n$ then is 1 and the phosphorus atoms each are linked through methylene groups via indicated valencies not yet occupied.

Finally, polymers are obtained which contain a great number of such 8-membered rings in sequence, when equimolar quantities of a tris(aminomethyl)phosphine and hydrogen phosphide are brought to reaction:

(IX)
$$2n\ P(CH_2NR'R'')_3 + 2n\ PH_3 \longrightarrow$$
$$\left[\begin{array}{c} -CH_2-P-CH_2-P- \\ | \quad\quad\quad | \\ CH_2 \quad\quad CH_2 \\ | \quad\quad\quad | \\ -CH_2-P-CH_2-P- \end{array}\right]_n + 6n\ R'R''NH$$

The expert will easily recognize that the degree of cross-linking can be varied in the reaction (VI) by adding a definite amount of a trifunctional phosphine which will act as a cross-linking agent, or, in the reactions (VII–IX) by varying the molar proportions of the reaction partners.

It has further been found that the reaction of invention can also be carried out so that one or more aminomethyl groups will be preserved in the end products. The preparation of such aminomethyl-containing methylenediphosphines, dimethylenetriphosphines, trimethylenetetraphosphines, cyclic and polymeric methylenediphosphines is a further object of this invention. In this case, bis- and tris(aminomethyl)phosphine derivatives are needed as starting materials. These are reacted with hydrogen phosphide, primary or secondary phosphines on principle in a similar manner. Hereby, the ratio of the hydrogen atoms attached to the phosphorus atom and the aminomethyl substituents present in the reaction mixture has always to be smaller than 1:1, and, as a rule, to be 1:2, 2:3 or 1:3. The reaction proceeds, for example, according to the scheme:

(X) $P(CH_2NR'R'')_3 + R_2PH \rightarrow (R''R'NCH_2)_2P$
$$-CH_2-PR_2 + R'R''NH$$

From equimolar quantities of a tris(aminomethyl)phosphine and a primary phosphine are obtained cyclic methylenediphosphines which contain aminomethyl as substituents:

(XI)
$$2P(CH_2NR'R'')_3 + 2PRH_2 \longrightarrow$$
$$\begin{array}{c} R''R'NCH_2P-CH_2-PR \\ | \quad\quad\quad\quad | \\ H_2C \quad\quad\quad CH_2 \\ | \quad\quad\quad\quad | \\ RP-CH_2-PCH_2NR'R'' \end{array} + 4R'R''NH$$

Amine radicals are always replaced by phosphine radicals in the reaction of invention. The radical NR'R'' therefore is such of an easily volatile amine, e.g. methylamine, dimethylamine, ethylamine, diethylamine, if such radicals are all to be replaced. In the second class of end products which still contain one or more aminomethyl groups, the radical NR'R'' can be derived from any amine, even being difficultly volatile or non-volatile, provided that a radical NR'R'' of such an amine which is easily volatile at the reaction temperature is also present in the starting material or reactant. Such a radical is necessary for the reaction. The reaction between aminomethylphosphine derivatives and phosphines is achieved by heating the reactants in the calculated proportions. The reaction temperature depends on the reactivity of the reactants. It lies generally in the range of about 100–250° C. One can work with or without a solvent. Hydrogen phosphide is conveniently reacted in an autoclave. The reaction is preferably carried out in an inert atmosphere, like nitrogen, since the phosphines are very easily oxidized. The course of the reaction can be followed up by the determination of the amount of amine which is split off.

Methylenediphosphines have not been known, except the simplest compound $R_2PCH_2PR_2$. Methylenediphosphines containing one or several aminomethyl substituents are novel too. The end products of invention can be used as polymerization catalyst, flame-proofing agent and pesticide. Moreover, they are strong complexing agents and can be used for, e.g., the extraction of metal salts from aqueous solution. The polymeric methylenediphosphines are, according to the organic substituents present, liquid, wax- or resin-like products. They can be used as adhesive, or be converted into shaped goods, so far as their nature permits. The methylenediphosphines further are valuable intermediates. By direct oxidation with elemental oxygen e.g., by injecting oxygen or air using a gas distributor with cooling and stirring, or, by treating the aqueous suspension with hydrogen peroxide or other suitable oxidizing agents, the methylenediphosphines are converted into the corresponding oxides, which are complexing agents too. The analogous sulfides are obtained in a manner known per se by the action of elemental sulfur, suitably in a solvent like $CS_2$.

Example 1

14.5 g. of tris-(diethylaminomethyl)phosphine and 9.3 g. of diphnylphosphine (molar ratio 1:1) are heated at 140° C. Thereby 1.7 g. of diethylamine is distilling off (=45% of the theory). The residue is fractionally distilled and the compound $[(C_2H_5)_2NCH_2]_2PCH_2P(C_6H_5)_2$ is obtained in form of a colorless liquid.

Yield 9 g. (=40%); B.P. 142–43° C./0.01 mm.

*Analysis.*—$C_{23}H_{36}N_2P_2$: Calc.: C, 68.65; H, 9.01; N, 6.96. Found: C, 69.64; H, 9.02; N, 6.84.

On oxidation with $KMnO_4$ in acetone, the oxide

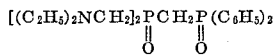

is obtained; M.P. 98–100° C. On addition of sulfur in $CS_2$-solution, the sulfide

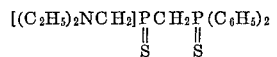

is obtained; M.P. 152–3° C.

*Analysis.*—$C_{23}H_{36}N_2P_2S_2$: Calc.: C, 59.20; H, 7.78. Found: C, 59.34; H, 7.40.

Example 2

10 g. of bis-(diethylaminomethyl)phenylphosphine and 6.65 g. of diphenylphosphine (molar ratio 1:1) are heated at 130° C. for 2 hours. Thereby diethylamine is distilling off. On fractional distillation there is obtained $$(C_2H_5)_2NCH_2P(C_6H_5)CH_2P(C_6H_5)_2$$

in form of a colorless liquid.

Yield 5 g. (=35% of the theory); B.P. 210° C./0.05 mm.

*Analysis.*—$C_{24}H_{29}NP_2$: Calc.: C, 73.26; H, 7.43; N, 3.56; P, 15.75. Found: C, 72.97; H, 7.20; N, 3.37; P, 16.34.

The oxide,

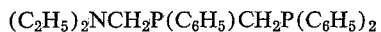

melts at 183–4.5° C.

*Analysis.*—$C_{24}H_{29}NP_2O_2$: Calc.: C, 67.75; H, 6.87; P, 14.56. Found: C, 68.01; H, 6.15; P, 14.45.

Example 3

Equimolar quantities of $(C_6H_5)_2PCH_2N(C_2H_5)_2$ and $HP(C_6H_5)_2$ are heated at 150–80° C. in a nitrogen atmosphere for 2 hours. Thereby diethylamine is distilling off. The reaction product is $(C_6H_5)_2PCH_2P(C_6H_5)_2$.

Yield: quantitative; M.P. 122° C.

*Analysis.*—$C_{25}H_{22}P_2$ (384.4): Calc.: 78.11; H, 5.77. Found: C, 78.66; H, 5.67.

Example 4

20 g. (0.07 mole) of $C_6H_5P[CH_2N(C_2H_5)_2]_2$ (B.P. 165–90° C./0.05 mm., $n_D^{20}$ 1.5308) and 26.6 g. (0.14 mole) of $HP(C_6H_5)_2$ are heated at 160° C. in a nitrogen atmosphere for 8 hours. Thereby the theoretical amount of diethylamine is distilling off. The viscous liquid is cooled at room temperature and crystallized after a few days. It consists of

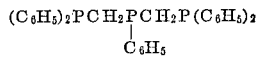

Yield: quantitative; M.P. 107–110° C.; B.P. 135–140° C./$10^{-5}$ mm.

*Analysis.*—$C_{32}H_{29}P_3$ (506.5): Calc.: C, 75.88; H, 5.77; P, 18.34. Found: C, 76.2; H, 5.33; P, 17.40.

Example 5

20 g. (0.07 mole) of $C_6H_5P[CH_2N(C_2H_5)_2]_2$ and 7.9 g. (0.07 mole) of $H_2PC_6H_5$ are heated at 140° C. in a nitrogen atmosphere for 4 hours. Thereby the theoretical amount (10.2 g.) of diethylamine is distilling off. The viscous liquid is cooled at room temperature and crystallizes on addition of alcohol. It contains

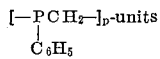

Yield: quantative.

One part of the product melts at 125–7° C. and has a molecular weight of 500 (determined by cryoscopic method in benzene). The symbol $p$ in this product therefore is 4 and it is an eight-membered ring of the formula

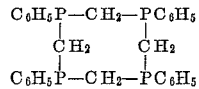

*Analysis.*—$C_{28}H_{28}P_4$ (488.4): Calc.: C, 68.85; H, 5.78; P, 25.4. Found: C, 67.33; H, 5.57; P, 27.2.

Also, another product has also been isolated which melts at 134–6° C. It is a higher polymeric product.

*Analysis.*—$(C_7H_7P)_p$: Calc.: C, 68.85; H, 5.78. Found: C, 70.2; H, 6.33.

On oxidation of the cyclic methylenediphosphine which is composed of eight-membered rings, by employing a technic usual in the oxidation of phosphines, the corresponding tetra-oxide is obtained. This compound is an excellent complexing-agent for metals and metal salts.

The embodiments of the invention in which an exclusive property or privilege is claimed are defined as follows:

1. A process for preparing a compound having at least one $PCH_2P$ grouping comprising heating in an inert atmosphere a first compound of the formula

wherein each R is selected from the class consisting of the phenyl group, and alkyl and alkaryl hydrocarbon having not more than 8 carbon atoms; R' is selected from the class consisting of the phenyl group, and alkyl and alkaryl hydrocarbon having not more than 8 carbon atoms; R" is selected from the class consisting of R' and a hydrogen atom, $a$ is an integer from 0 to 2, and a second compound of the formula

wherein R and $a$ are as defined hereinabove, at a temperature in the range of about 100–250° C. and for a time sufficient to split off and to volatilize in the form of a secondary amine the portion R'R"N of at least one aminomethyl substituent derived from an easily volatile amine.

2. A process of claim 1 wherein R for the second compound is the phenyl group, R' and R" are each alkyl having not more than 8 carbon atoms, $a$ of the first compound is 0, and $a$ of the second compound is 2.

3. A process of claim 1 wherein each R is the phenyl group, R' and R" are each alkyl having not more than 8 carbon atoms, the $a$ for the first compound is one, and the $a$ for the second compound is two.

4. A process of claim 1 wherein each R is the phenyl group, R' and R" are each alkyl having not more than 8 carbon atoms, and $a$ is two for both compounds.

5. A process of claim 1 wherein each R is the phenyl group, R' and R" are each alkyl having not more than 8 carbon atoms, $a$ for the first compound is one, and $a$ for the second compound is two.

6. A process of claim 1 wherein each R is the phenyl group, R' and R" are each alkyl having not more than 8 carbon atoms, and $a$ for both compounds is one.

7. A compound of the formula $$-\overset{X_b}{\underset{|}{\overset{\|}{P}}}-CH_2-\overset{X_b}{\underset{|}{\overset{\|}{P}}}-$$

wherein at least one of the valences of a phosphorus atom is satisfied with an R'R"NCH$_2$ R' is selected from the class consisting of the phenyl group, and alkyl and alkaryl hydrocarbon having not more than 8 carbon atoms, and R" is selected from the class consisting of R' and a hydrogen atom group, and the other valences of the phosphorus atom are satisfied by R and each R is selected from the class consisting of the phenyl group, and alkyl and alkaryl hydrocarbon having not more than 8 carbon atoms, each X is selected from the class consisting of oxygen and sulfur atoms, and $b$ is an integer from 0 to 1.

8. A compound of the formula $$R_2PCH_2P(CH_2NR'R'')_2$$

wherein each R is the phenyl group, and R' and R" are each alkyl having not more than 8 carbon atoms.

9. A compound of the formula $$R_2\overset{O}{\overset{\|}{P}}CH_2\overset{O}{\overset{\|}{P}}(CH_2NR'R'')_2$$

wherein each R is the phenyl group, and R' and R" are each alkyl having not more than 8 carbon atoms.

10. A compound of the formula $$R_2\overset{S}{\overset{\|}{P}}CH_2\overset{S}{\overset{\|}{P}}(CH_2NR'R'')_2$$

wherein each R is the phenyl group, and R' and R" are each alkyl having not more than 8 carbon atoms.

11. A compound of the formula $$R'R''NCH_2P(R)CH_2PR_2$$

wherein R is the phenyl group, and R' and R" are each alkyl having not more than 8 carbon atoms.

12. A compound of the formula $$R'R''NC H_2\overset{O}{\overset{\|}{P}}(R)C H_2\overset{O}{\overset{\|}{P}}R_2$$

wherein each R is the phenyl group, and R' and R" are each alkyl having not more than 8 carbon atoms.

13. A compound of the formula $$R_2PCH_2P(R)CH_2PR_2$$

wherein each R is the phenyl group.

14. A compound of the formula $$\begin{array}{c} RP-CH_2-PR \\ | \quad\quad\quad | \\ CH_2 \quad\quad CH_2 \\ | \quad\quad\quad | \\ RP-CH_2-PR \end{array}$$

wherein each R is the phenyl group.

15. A polymer having the formula $$[-\underset{R}{\overset{|}{P}}CH_2-]_p$$

wherein R is the phenyl group, and $p$ representing the degree of the polymerization is an integer greater than 4.

References Cited by the Examiner
UNITED STATES PATENTS

| | | | |
|---|---|---|---|
| 2,642,461 | 6/1953 | Morris et al. | 260—606.5 |
| 3,035,053 | 5/1962 | Coates et al. | 260—2 |
| 3,044,984 | 7/1962 | Bloomfield | 260—2 |

CHARLES B. PARKER, *Primary Examiner.*

WILLIAM H. SHORT, *Examiner.*